(12) United States Patent
Chen

(10) Patent No.: US 9,778,462 B2
(45) Date of Patent: Oct. 3, 2017

(54) ASEISMATIC REFLECTION SHEET DEVICE

(71) Applicant: E-LEAD ELECTRONIC CO., LTD., Changhua (TW)

(72) Inventor: Stephen Chen, Changhua (TW)

(73) Assignee: E-LEAD ELECTRONICS CO., LTD., Changhua (TW)

( * ) Notice: Subject to any disclaimer, the term of this patent is extended or adjusted under 35 U.S.C. 154(b) by 68 days.

(21) Appl. No.: 14/928,429

(22) Filed: Oct. 30, 2015

(65) Prior Publication Data

US 2017/0123206 A1    May 4, 2017

(51) Int. Cl.
    *G02B 27/14*    (2006.01)
    *G02B 27/01*    (2006.01)
    *B60K 37/02*    (2006.01)

(52) U.S. Cl.
    CPC .......... *G02B 27/0149* (2013.01); *B60K 37/02* (2013.01); *B60K 2350/941* (2013.01); *G02B 2027/0169* (2013.01)

(58) Field of Classification Search
    CPC ......... B60R 1/081; B60R 1/078; B60R 1/082; B60R 1/10; B60R 1/06; B60R 1/0605; B60R 1/04; B60R 1/12; B60R 1/072; G02B 7/1824; G02B 7/182; G02B 7/1825; G02B 7/1827

USPC ................ 359/630, 865, 871–884
See application file for complete search history.

(56) References Cited

U.S. PATENT DOCUMENTS

| 2,989,897 A | * | 6/1961 | Bertell | ............... | B60R 1/04 248/205.1 |
| 5,172,100 A | * | 12/1992 | Iino | ............... | B60K 37/02 345/7 |
| 6,318,697 B1 | * | 11/2001 | Corrado | ............... | B60R 1/12 248/475.1 |

* cited by examiner

*Primary Examiner* — Scott J Sugarman
*Assistant Examiner* — Vipin Patel
(74) *Attorney, Agent, or Firm* — Guice Patents PLLC

(57) ABSTRACT

The invention relates to an aseismatic reflection sheet device, which includes a reflection sheet, a weight support element, an angle fixed adjustment module, a base plate and at least a sliding module. By the composition of above structure, one side of the weight support element is fixed on a vehicle windshield and the weight of the aseismatic reflection sheet device is mostly supported by the part of the weight support element, so that the reflection sheet does not be affected by shocking of the vehicle dashboard, to thereby provide support to the reflection sheet and the vertical and horizontal angle may be easily adjusted.

17 Claims, 12 Drawing Sheets

ASEISMATIC REFLECTION SHEET DEVICE

BACKGROUND OF THE INVENTION a) Field of the Invention

The invention relates to an aseismatic reflection sheet device and, more particularly, a reflection sheet device used in a head-up display with an aseismatic effect that the reflection sheet does not be affected by shocking of the vehicle dashboard, to thereby provide support to the reflection sheet and the vertical and horizontal angle may be easily adjusted.

b) Description of the Prior Art

There are more and more information in vehicle, it is dangerous that drivers usually take their eyes off the road to read information during driving. In order to solve the drawbacks, head-up displays are developed, so that drivers may simultaneously read information and pay attention on the road conditions ahead. Especially the head-up display using concave mirror for imaging, display area may be enlarged and the distance from the displayed image to drivers' eyes is far enough, usually greater than 2 meters. When drivers see the displayed information, focal length of eyes is near drivers' line of sight for watching road conditions, so that drivers may pay attention on the road during reading information, the danger of driving may be reduced significantly.

The virtual imaging is imaged by using a concave mirror, the imaging formula (of concave mirror) is: $1/p+1/q=1/f$, wherein f is focal distance, q is object distance, p is image distance. Virtual images may be enlarged in a general magnification, and the distance of virtual image may simultaneously be become farer in the same ratio, between four to six times, thus, readers may be in the best condition. If magnification is too large, readers may feel dizzy easily, so that the distance between the virtual image and drivers' eye may be larger than 2 meters, and the location of image may be in the rear of the reflection sheet with distance larger than 1.2 meters, namely, distance of optical path from display to concave mirror may be larger than 24 cm (if the magnification is five times). Besides, distance of optical path may be increased by reflecting back and forth through mirror surface, but the volume needed by optical path is large, so a space is usually reserved for head-up display device inside the vehicle dashboard.

This method may only be used if the original manufacturer reserves desired space at design time. For the market of installation, the head-up display cannot be installed on the vehicle dashboard because the size is too large with optical path device, even may obstruct drivers' line of sight.

Another solution for optical path device with large size is separating it that the display is fixed on the top of the windshield and the reflection sheet is fixed on vehicle dashboard. However, vehicle dashboards in many vehicles may shock due to rotation of engine or air conditioning compressor, and the reflection sheet fixed on the top may be shocked. Also, the displacement of shocking may be enlarged due to enlarge effect of concave mirror, and displayed image may shocked severely.

In order to solve the problem of the reflection sheet being shocked, the inventor of the present invention refers to the cited references TW publication no. 530961, TW M273183, TW M375372, TW publication no. 576080, TW 1352165, TW M288937, TW M275639 etc., and found that for the problem that the conventional reflection sheet being shocked, the related technical content and applications still have technical bottlenecks.

SUMMARY OF THE INVENTION

In view of this, the inventor finally completes aseismatic reflection sheet device of the present invention after numerous improvements, namely, the object of the present invention is to provide a reflection sheet device used in a head-up display with an aseismatic effect, whereby the reflection sheet does not be affected by shocking of the vehicle dashboard, to thereby provide support to the reflection sheet and the vertical and horizontal angle may be easily adjusted.

To achieve the above object according to the invention, the aseismatic reflection sheet device of the present invention, including:

a reflection sheet, a first joint element is set on its top, and a second joint element is set on the bottom of the reflection sheet;

a weight support element, a fixed element is set on its one side, the fixed element is fixed on a vehicle windshield, a third joint element is set on another side of the weight support element, the third element is correspondingly connected to the first joint element on the top of the reflection sheet and formed a bendable or rotatable joint mechanism;

an angle fixed adjustment module, which is used to fix and adjust' an angle of the reflection sheet, including at least a lateral support element, a fourth joint element is set on an end of the lateral support element, the fourth element is correspondingly connected to the second joint element on the bottom of the reflection sheet and formed a bendable or rotatable joint mechanism;

a base plate, which is a plate body fixed on a vehicle dashboard;

at least a sliding module, which is connected to the lateral support element, a positioning element is set on the bottom of the sliding module for being fixedly positioned on the base plate;

by the composition of above structure, one side of the weight support element is fixed on a vehicle windshield and the weight of the aseismatic reflection sheet device is mostly supported by the part of the weight support element, so that the reflection sheet does not be affected by shocking of the vehicle dashboard; the base plate is fixed on the vehicle dashboard through the connection of the lateral support element and the sliding module being positioned on the base plate, to thereby provide support to the reflection sheet and the vertical and horizontal angle may be easily adjusted.

The above fixed element, is a double-sided adhesive tape or a sucking disc.

The above base plate is a magnetic metal, the positioning element is a magnet, a double-sided adhesive tape is set on the bottom of the base plate for being fixed on the vehicle dashboard.

The above base plate, whose surface is flannel material surface that Velcro may be attached to, the positioning element has a Velcro surface, a double-sided adhesive tape is set on the bottom of the base plate for being fixed on the vehicle dashboard.

The above first joint element and the second joint element are spherical structure.

The above third joint element and the fourth joint element are concave structure.

The above lateral support element, a fifth joint element is set on its another end, a sixth joint element is set on the top of the sliding module, the sixth joint element is correspondingly foxed to the fifth joint element of the lateral support element and a joint mechanism is formed; the fifth joint element and the sixth joint element are combined together as a shaft structure.

The aseismatic reflection sheet device of the present invention, wherein two second joint elements are set on the bottom of the reflection sheet; the angle fixed adjustment module further includes two lateral support elements, a fourth joint element is set on an end of the lateral support element, a fifth joint element is set on another end of the lateral support element, the fourth joint element is correspondingly fixed to the second joint element on the bottom of the reflection sheet and formed a bendable or rotatable joint mechanism; and two corresponded sliding modules, a sixth joint element is set on the top of the sliding module, the sixth joint element is correspondingly fixed to the fifth joint element of the lateral support element and formed a joint mechanism.

The aseismatic reflection sheet device of the present invention, wherein two second joint elements are further set on the bottom of the reflection sheet; the angle fixed adjustment module further includes two lateral support elements, a fourth joint element is set on an end of the lateral support element, a fifth joint element is set on another end of the lateral support element, the fourth joint element is correspondingly fixed to the second joint element on the bottom of the reflection sheet and formed a bendable or rotatable joint mechanism; and two sixth joint elements are set on the top of the sliding module, the sixth joint element is correspondingly fixed to the fifth joint element of the lateral support element and a joint mechanism is formed.

The aseismatic reflection sheet device of the present invention, wherein two joint elements are further set on the bottom of the reflection sheet; the angle fixed adjustment module further includes a V-shaped structure combined by two lateral support elements, a fourth joint element is set on an end of the two lateral support elements, another ends of the two lateral support elements are combined together and a seventh joint element is set on, the fourth joint element is correspondingly fixed to the second joint element on the bottom of the reflection sheet and a bendable or rotational joint mechanism is formed; and the sixth joint element of the sliding module is correspondingly fixed to the seventh joint element and a joint mechanism is formed.

The second embodiment of the aseismatic reflection sheet device of the present invention, including:

a reflection sheet, a first joint element is set on its top, and a second joint element is set on the bottom of the reflection sheet;

a weight support element, a fixed element is set on its one side, the fixed element is fixed on a vehicle windshield, a third joint element is set on another side of the weight support element, the third element is correspondingly connected to the first joint element on the top of the reflection sheet and formed a bendable or rotatable joint mechanism;

an angle fixed adjustment module, which is used to fix and adjust an angle of the reflection sheet, including at least a lateral support element, a fourth joint element is set on an end of the lateral support element, a fifth joint element is set on another end of the lateral support, the fourth element is correspondingly connected to the second joint element on the bottom of the reflection sheet and formed a bendable or rotatable joint mechanism;

a base plate, which is a plate body fixed on a vehicle dashboard;

at least a sliding module, which is connected to the lateral support element, the bottom of the sliding module is embedded into the trench of the base plate.

The above fixed element is a double-sided adhesive tape or a sucking disc.

The above base plate, a double-sided adhesive tape is set on the bottom of the base plate for being fixed on the vehicle dashboard.

The above first joint element and the second joint element are spherical structure.

The above third joint element and the fourth joint element are concave structure.

The above lateral support element, a fifth joint element is set on its another end, a sixth joint element is set on the top of the sliding module, the sixth joint element is correspondingly fixed to the fifth joint element of the lateral support element and a joint mechanism is formed; the fifth joint element and the sixth joint element are combined as a shaft structure.

The aseismatic reflection sheet device of the present invention, wherein two second joint elements are set on the bottom of the reflection sheet, the angle fixed adjustment module further includes two lateral support element, a fourth joint element is set on an end of the lateral support element, a fifth joint element is set on another end of the lateral support element, the fourth joint element is correspondingly fixed to the second joint element on the bottom of the reflection sheet and a rotational or bendable joint mechanism is formed; and two corresponding sliding module, a sixth joint element is set on the top of the sliding module, the sixth joint element is correspondingly fixed to the fifth joint element of the lateral support element and a joint mechanism is formed.

The aseismatic reflection sheet device of the present invention, wherein two second joint elements are set on the bottom of the reflection sheet; the angle fixed adjustment module further includes two lateral support elements, a fourth joint element is set on an end of the lateral support element, a fifth joint element is set on another end of the lateral support element, the fourth joint element is correspondingly fixed to the second joint element on the bottom of the reflection sheet and a rotational or bendable joint mechanism is formed; and two sixth joint elements are set on the top of the sliding module, the sixth joint element is correspondingly fixed to the fifth joint element of the lateral support element and a joint mechanism is formed.

The aseismatic reflection sheet device of the present invention, wherein two joint elements are set on the bottom of the reflection sheet; the angle fixed adjustment module further includes a V-shaped structure combined by two lateral support elements, a fourth joint element is set on an end of the two lateral support elements, another ends of the two lateral support elements are combined together and a seventh joint element is set on, the fourth joint element is correspondingly fixed to the second joint element on the bottom of the reflection sheet and a bendable or rotational joint mechanism is formed; and the sixth joint element of the sliding module is correspondingly fixed to the seventh joint element and a joint mechanism is formed.

DETAILED DESCRIPTION OF THE INVENTION

Figure 1:
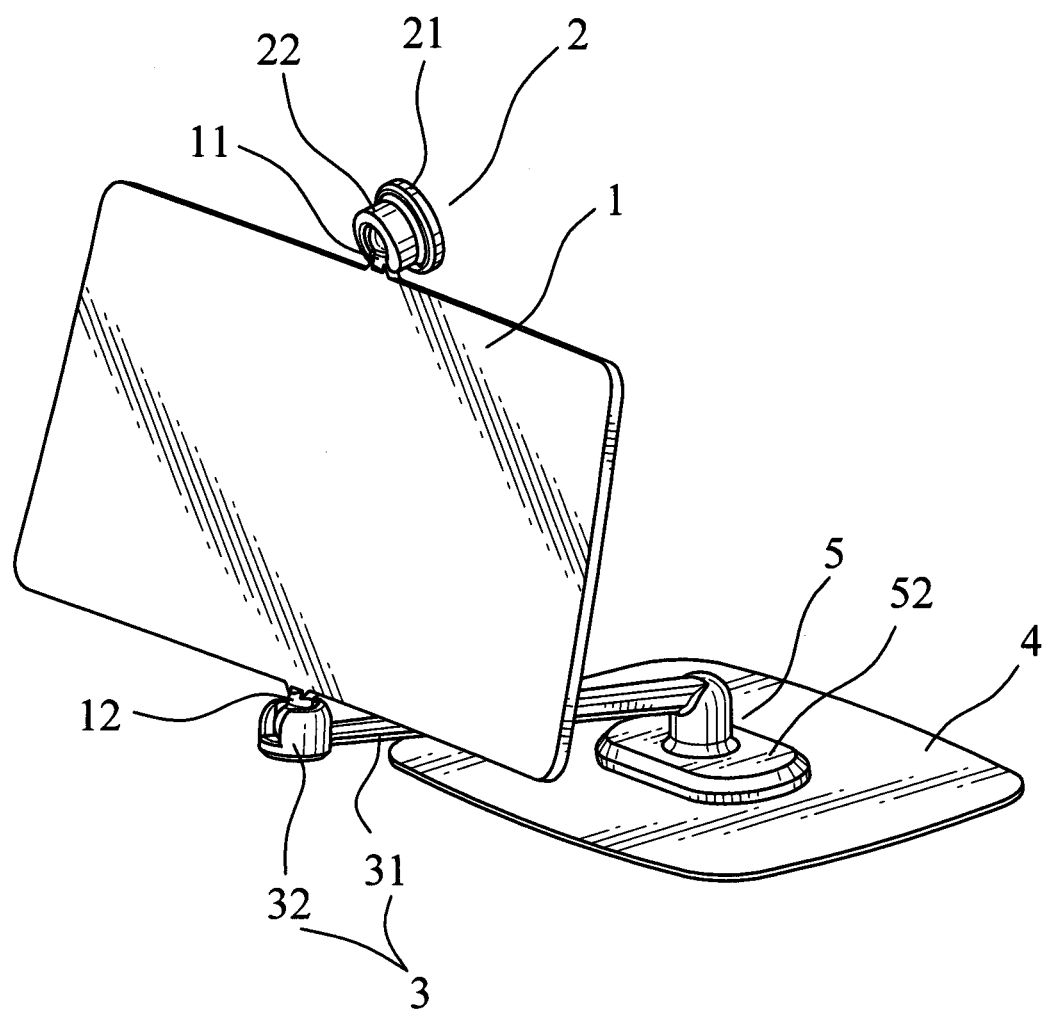
FIG. 1 is a three-dimensional schematic diagram of example 1 of the first embodiment according to the present invention.

As shown in FIG. 1, which is an example 1 of the first embodiment of the aseismatic reflection sheet device of the present invention (please refer to FIG. 11 simultaneously), which includes:

a reflection sheet 1, which is a translucent concave mirror with translucent semi-reflecting effect, a first joint element 11 is set on the top of the reflection sheet 1, and at least a second joint element 12 is set on the bottom of the reflection sheet 1, the first joint element 11 and the second joint element 12 are spherical structure;

a weight support element 2, a fixed element 21 is set on its one side, the fixed element 21 is a double-sided adhesive tape or a sucking disc, the fixed element 21 is fixed on a vehicle windshield W, a third joint element 22 is set on another side of the weight support element 2, the third element 22 is correspondingly connected to the first joint element 11 on the top of the reflection sheet 1 and formed a bendable or rotatable joint mechanism;

an angle fixed adjustment module 3, which is used to fix and adjust an angle of the reflection sheet 1, including at least a lateral support element 31, a fourth joint element 32 is set on an end of the lateral support element 31, the fourth element 32 is a concave structure, the fourth element 32 is correspondingly connected to the second joint element 12 on the bottom of the reflection sheet 1 and formed a bendable or rotatable joint mechanism;

a base plate 4, which is a plate body fixed on a vehicle dashboard B, a double-sided adhesive tape is set on the bottom of the base plate 4 for being fixed on the vehicle dashboard B;

at least a sliding module 5, which is connected to another end of the lateral support element 31, a positioning element 52 is set on the bottom of the sliding module 5 for being fixedly positioned on the base plate 4.

The above base plate 4 is a magnetic metal, the positioning element 52 is a magnet, which may be attached to the base plate 4.

The above base plate 4, whose surface is flannel material surface that Velcro may be attached to, a double-sided adhesive tape is set on the bottom of the base plate 4 for being fixed on the vehicle dashboard B, the positioning element 52 on the bottom of the sliding module 5 has a Velcro surface, the sliding module 5 may be moved to a desired position on the base plate 4 by the material property that Velcro surface may be attached and positioned on flannel material surface.

Figure 11:
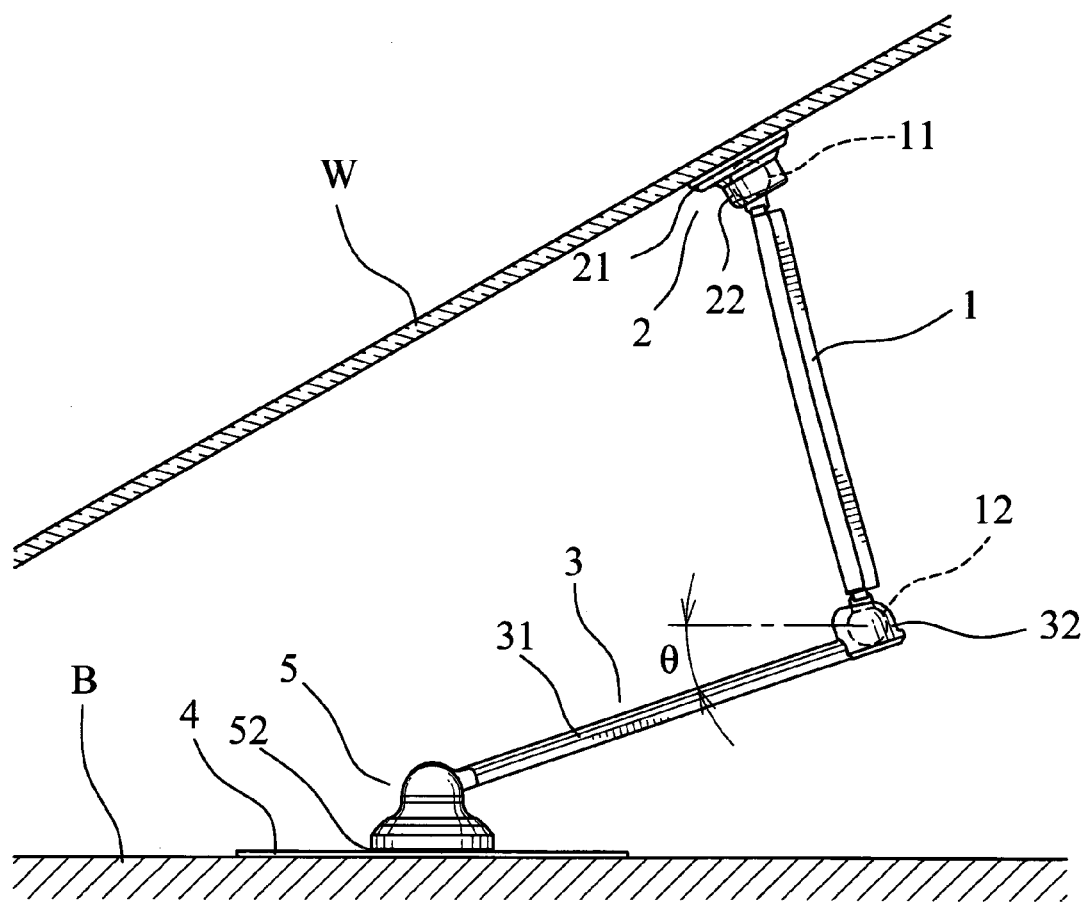
FIG. 11 is an operation diagram of the present invention.

By the composition of above structure, the weight of the aseismatic reflection sheet device of the present invention is mostly supported by the fixed element 21 of the weight support 2 being fixed on the vehicle windshield W, so that the reflection sheet 1 does not be affected by shocking of the vehicle dashboard B; the base plate 4 is fixed on the vehicle dashboard B through the connection of the lateral support element 31 and the sliding module 5 being positioned on the base plate 4, to thereby provide support to the reflection sheet 1 and the vertical and horizontal angle θ may be easily adjusted (as shown in FIG. 11).

Figure 2:
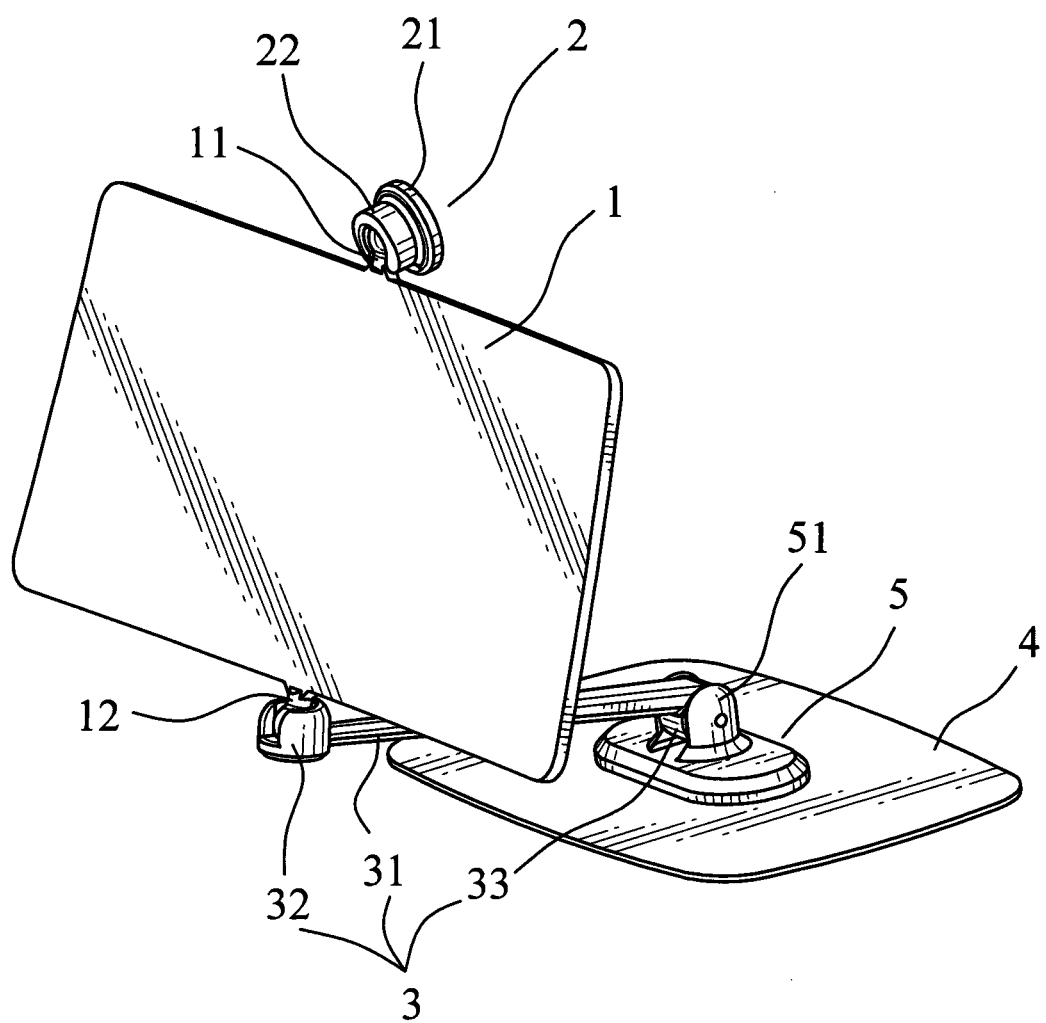
FIG. 2 is a three-dimensional schematic diagram of example 2 of the first embodiment according to the present invention.

As shown in FIG. 2, which is example 2 of the first embodiment of the aseismatic reflection sheet of the present invention, the above lateral support element 31, a fifth joint element 33 is further set on its another end, the fifth joint element 33 is a shaft structure, a sixth joint element 51 is set on the top of the sliding module 5, the sixth joint element 51 is a shaft structure, the sixth joint element 51 is correspondingly fixed to the fifth joint element 33 of the lateral support element 31 and a joint mechanism is formed.

Figure 3:
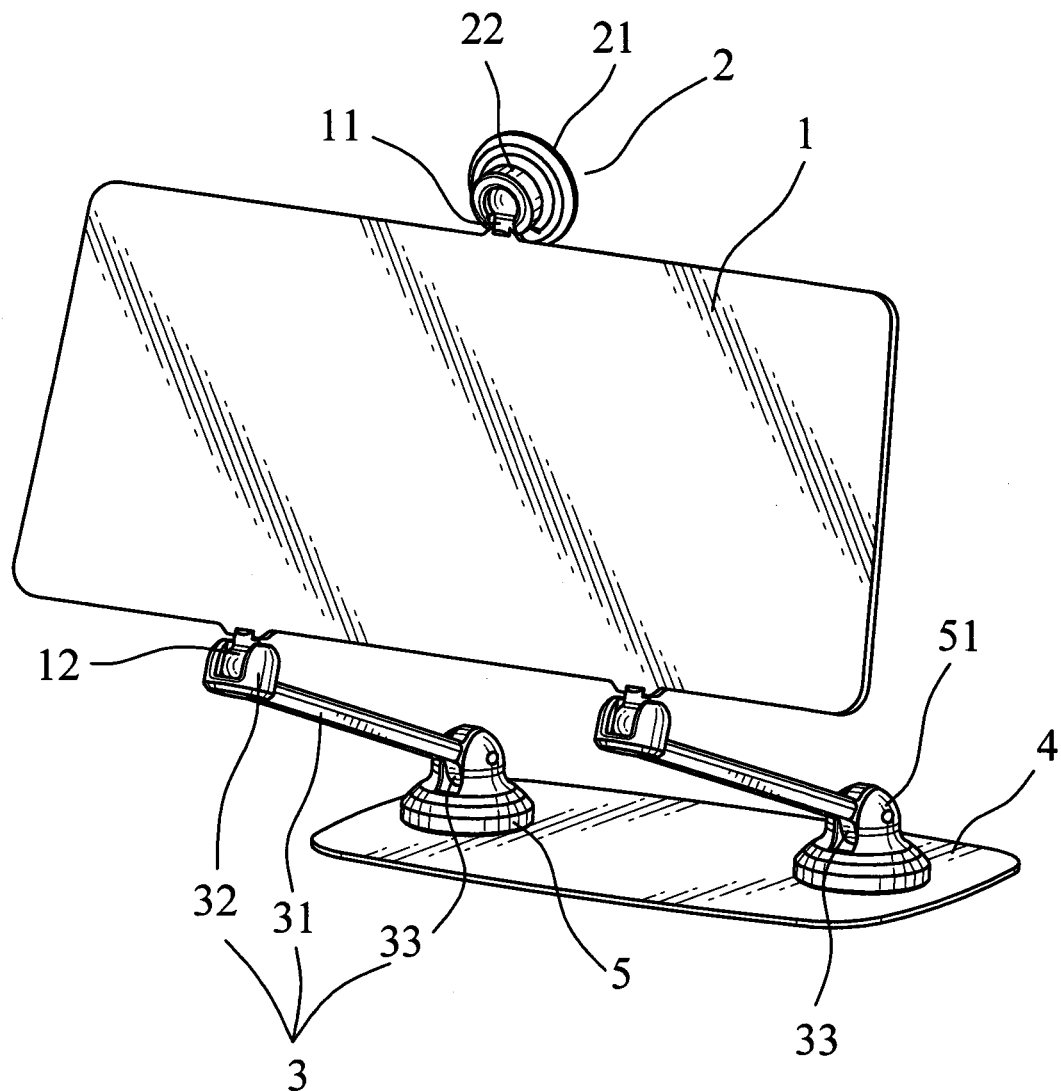
FIG. 3 is a three-dimensional schematic diagram of example 3 of the first embodiment according to the present invention.
Figure 12:
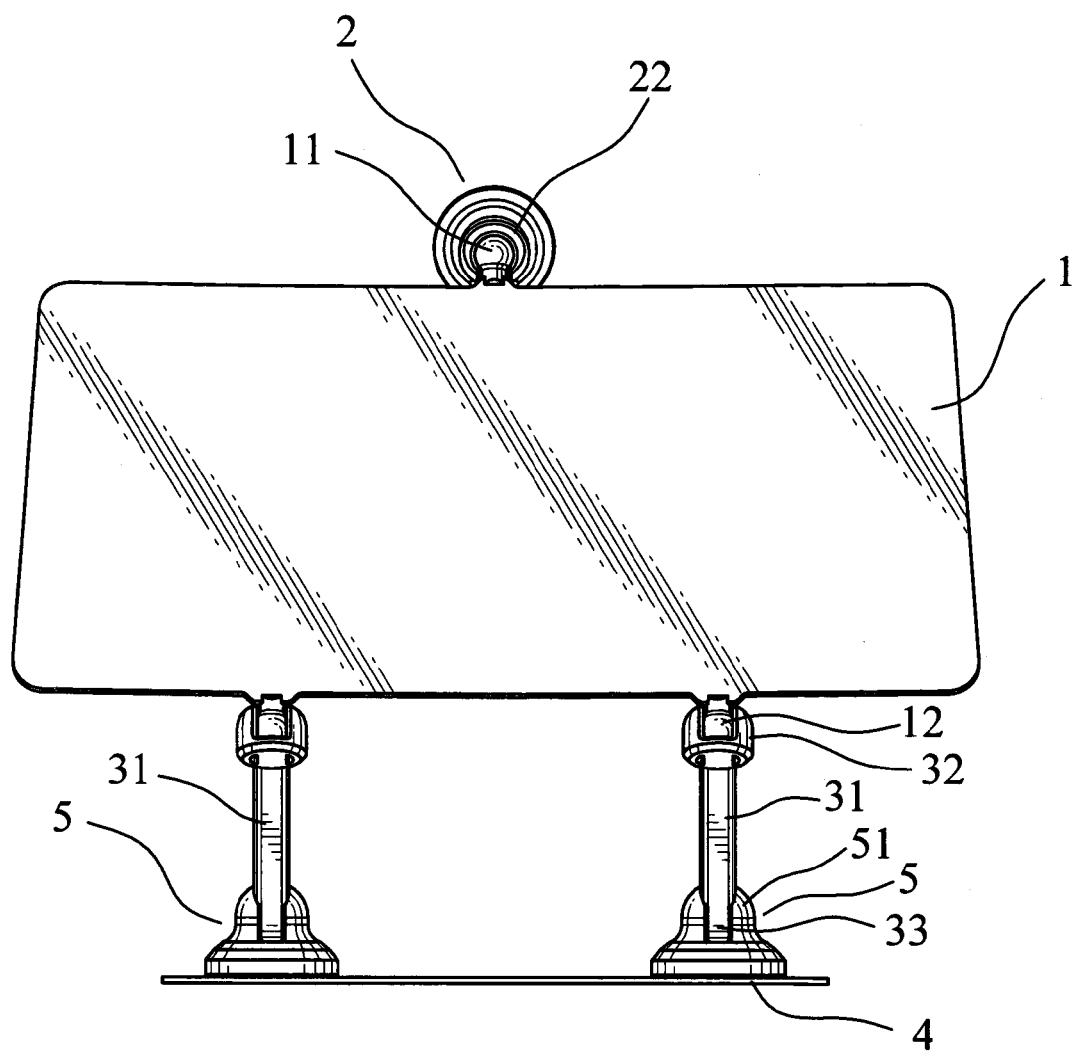
FIG. 12 is an implementation diagram of the present invention.

As shown in FIG. 3, which is example 3 of the first embodiment of the aseismatic reflection sheet of the present invention (please refer to FIG. 12 simultaneously), two second joint elements 12 are set on the bottom of the reflection sheet 1; the angle fixed adjustment module 3 further includes two lateral support elements 31, a fourth joint element 32 is set on an end of the lateral support element 31, a fifth joint element 33 is set on another end of the lateral support element 31, the fourth joint element 32 is correspondingly fixed to the second joint element 12 on the bottom of the reflection sheet 1 and a rotational or bendable joint mechanism is formed; and two sliding module 5, a sixth element 51 is set on the top of the sliding module 5, the sixth joint element 51 is correspondingly fixed to the fifth joint element 33 of the lateral support element 31 and a joint mechanism is formed.

Figure 4:
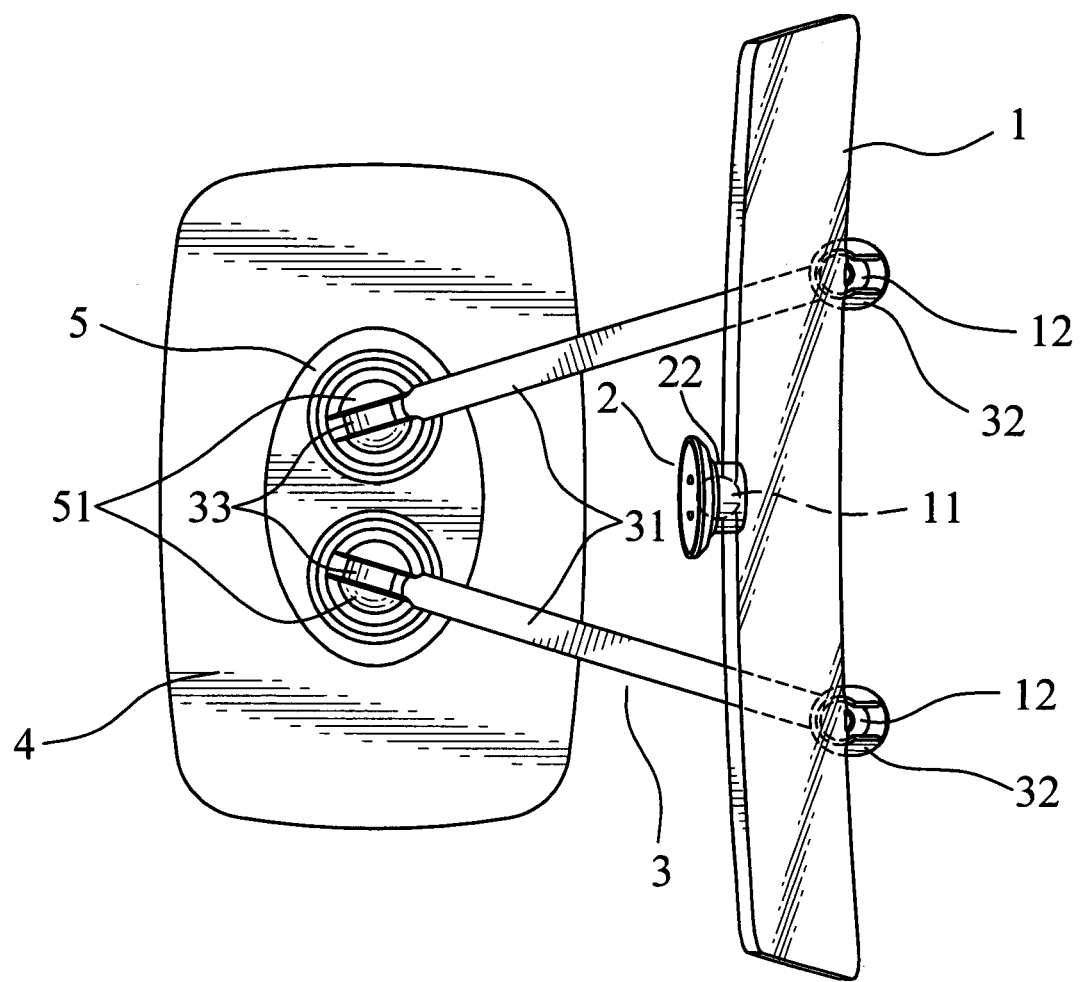
FIG. 4 is a three-dimensional schematic diagram of example 4 of the first embodiment according to the present invention.

As shown in FIG. 4, which is example 4 of the first embodiment of the present invention, two second joint elements are set on the bottom of the reflection sheet 1; the angle fixed adjustment module 3 further includes two lateral support elements 31, a fourth joint element 32 is set on an end of the lateral support element 31, a fifth joint element 33 is set on another end of the lateral support element 31, the fourth joint element 32 is correspondingly fixed to the second joint element 12 on the bottom of the reflection sheet 1 and a rotational or bendable joint mechanism is formed; and two sixth joint elements 51 are set on the top of the sliding module 5, the sixth joint element 51 is correspondingly fixed to the fifth joint element 33 of the lateral support element 31 and a joint mechanism is formed.

Figure 5:
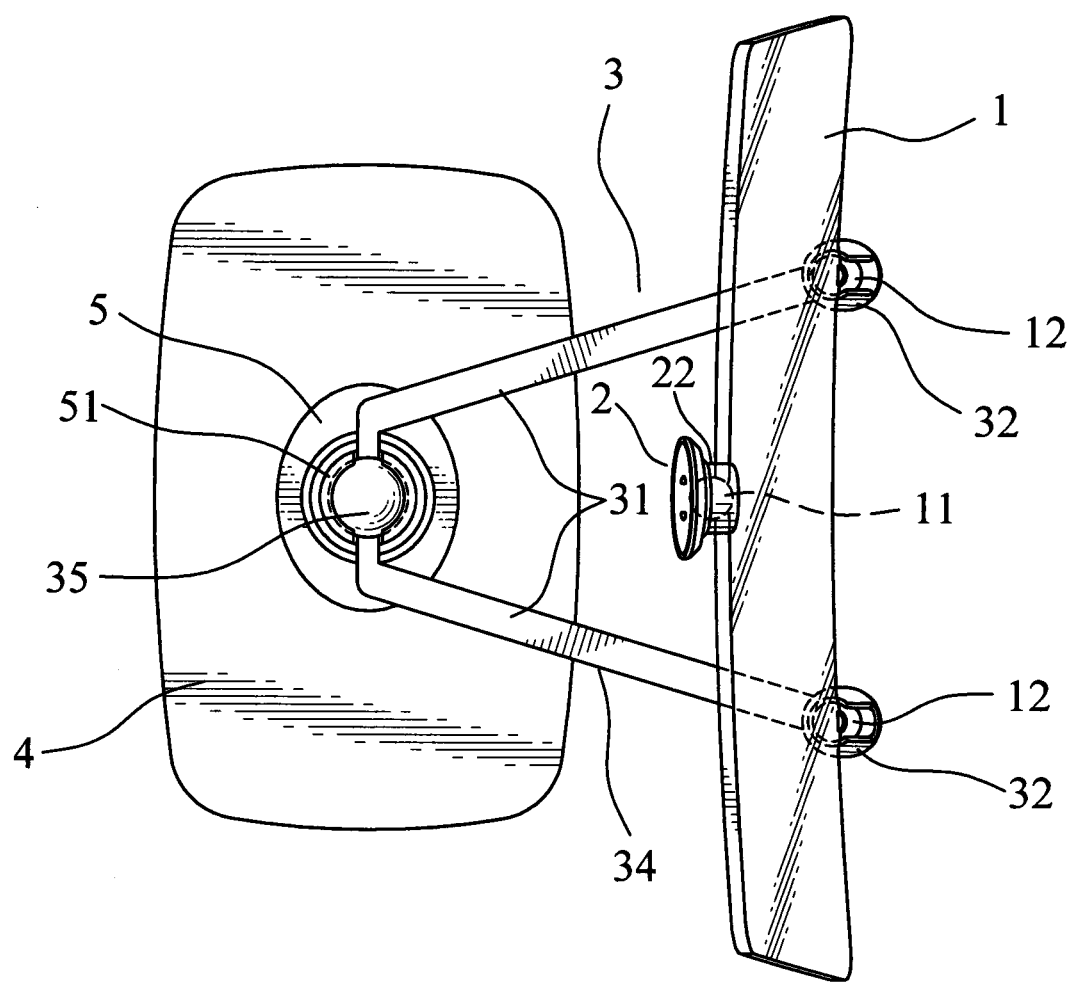
FIG. 5 is a schematic plan diagram of example 5 of the first embodiment according to the present invention.

As shown in FIG. 5, which is example 5 of the first embodiment of the present invention, two joint elements 12 are set on the bottom of the reflection sheet 1; the angle fixed adjustment module 3 further includes a V-shaped structure 34 combined by two lateral support elements 31, a fourth joint element 32 is set on an end of the two lateral support elements 31, another ends of the two lateral support elements 31 are combined together and a seventh joint element 35 is set on, the fourth joint element 32 is correspondingly fixed to the second joint element 12 on the bottom of the reflection sheet 1 and a bendable or rotational joint mechanism is formed; and the sixth joint element 51 of the sliding module 5 is correspondingly fixed to the seventh joint element 35 and a joint mechanism is formed.

Figure 6:
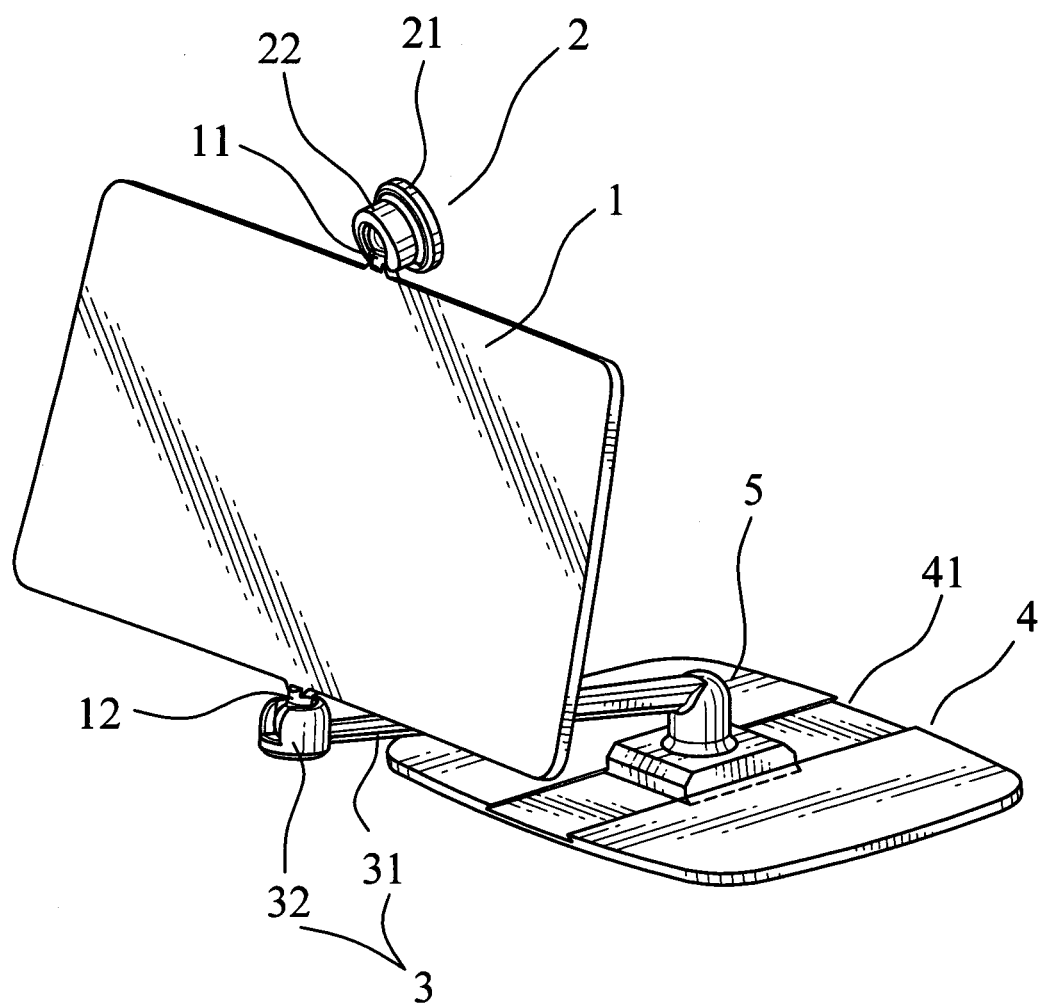
FIG. 6 is a three-dimensional schematic diagram of example 1 of the second embodiment according to the present invention.

As shown in FIG. 6, which is an example 1 of the second embodiment of the aseismatic reflection sheet device of the present invention, which includes:

a reflection sheet 1, which is a translucent concave mirror with translucent semi-reflecting effect, a first joint element 11 is set on the top of the reflection sheet 1, and at least a second joint element 12 is set on the bottom of the reflection sheet 1, the first joint element 11 and the second joint element 12 are spherical structure;

a weight support element 2, a fixed element 21 is set on its one side, the fixed element 21 is fixed on a vehicle windshield W, the fixed element 21 is a double-sided adhesive tape or a sucking disc, a third joint element 22 is set on another side of the weight support element 2, the third element 22 is correspondingly connected to the first joint element 11 on the top of the reflection sheet 1 and formed a bendable or rotatable joint mechanism;

an angle fixed adjustment module 3, which is used to fix and adjust' an angle of the reflection sheet 1, including at least a lateral support element 31, a fourth joint element 32 is set on an end of the lateral support element 31, the fourth element 32 is a concave structure, the fourth element 32 is correspondingly connected to the second joint element 12 on the bottom of the reflection sheet 1 and formed a bendable or rotatable joint mechanism;

a base plate 4, which is a plate body fixed on a vehicle dashboard B, a trench 41 is set on the base plate 4;

at least a sliding module 5, which is connected to another end of the lateral support element 31, a bottom of the sliding module 5 is embedded into the trench 41 of the base plate 4.

The aseismatic reflection sheet device of the present invention, a double-sided adhesive tape is set on the bottom of the base plate 4 for being fixed on the vehicle dashboard B.

By the composition of above structure, the weight of the aseismatic reflection sheet device of the present invention is mostly supported by the fixed element 21 of the weight support 2 being fixed on the vehicle windshield W, so that the reflection sheet 1 does not be affected by shocking of the vehicle dashboard B; the base plate 4 is fixed on the vehicle dashboard B through the connection of the lateral support element 31 and the sliding module 5 being positioned in the trench 41 of the base plate 4, to thereby provide support to the reflection sheet 1 and the vertical and horizontal angle θ may be easily adjusted (as shown in FIG. 11).

Figure 7:
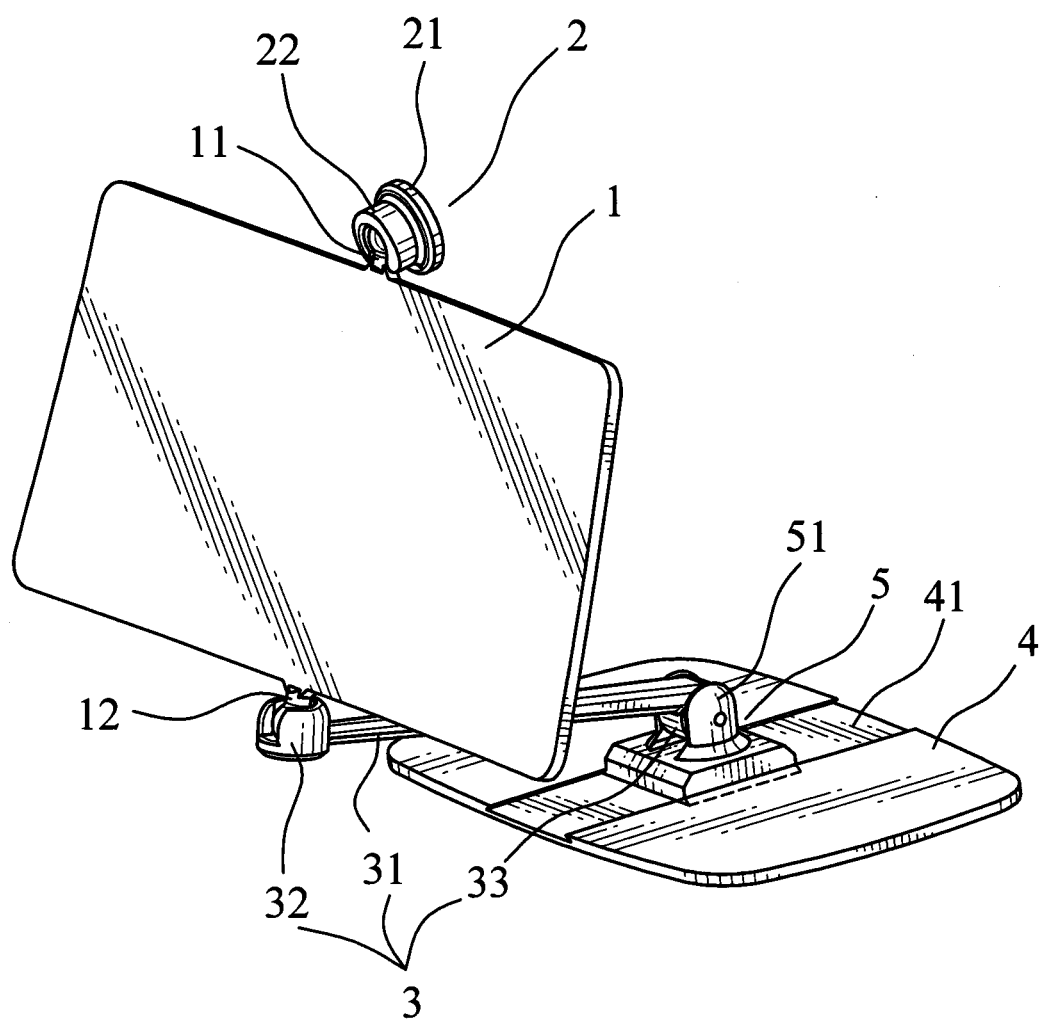
FIG. 7 is a three-dimensional schematic diagram of example 2 of the second embodiment according to the present invention.

As shown in FIG. 7, which is the example 2 of the second embodiment of the aseismatic reflection sheet device of the present invention, the above lateral support element 31, a fifth joint element 33 is further set on another end, the fifth joint element 33 is a shaft structure, a sixth joint element 51 is set on the top of the sliding module 5, the sixth joint element 51 is a shaft structure, the sixth joint element 51 is correspondingly fixed to the fifth joint element 33 of the lateral support element 31 and a joint mechanism is formed.

Figure 8:
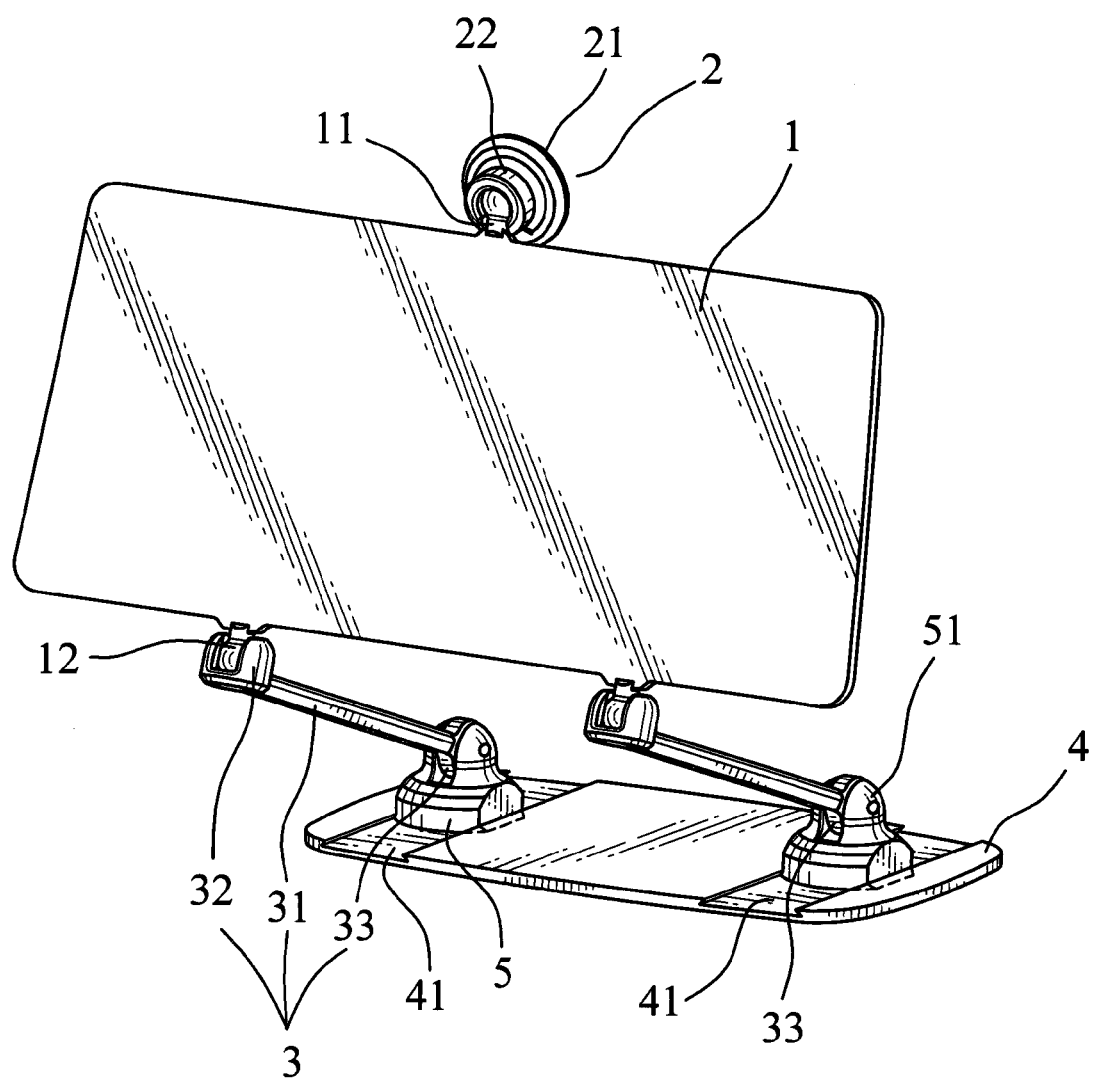
FIG. 8 is a three-dimensional schematic diagram of example 3 of the second embodiment according to the present invention.

As shown in FIG. 8, which is example 3 of the second embodiment of the aseismatic reflection sheet of the present invention, two second joint elements 12 are set on the bottom of the reflection sheet 1; the angle fixed adjustment module 3 further includes two lateral support elements 31, a fourth joint element 32 is set on an end of the lateral support element 31, a fifth joint element 33 is set on another end of the lateral support element 31, the fourth joint element 32 is correspondingly fixed to the second joint element 12 on the bottom of the reflection sheet 1 and a rotational or bendable joint mechanism is formed; and two corresponding sliding modules 5, a sixth joint element 51 is set on the top of the sliding module 5, the sixth joint element 51 is correspondingly fixed to the fifth joint element 33 of the lateral support element 31 and a joint mechanism is formed.

Figure 9:
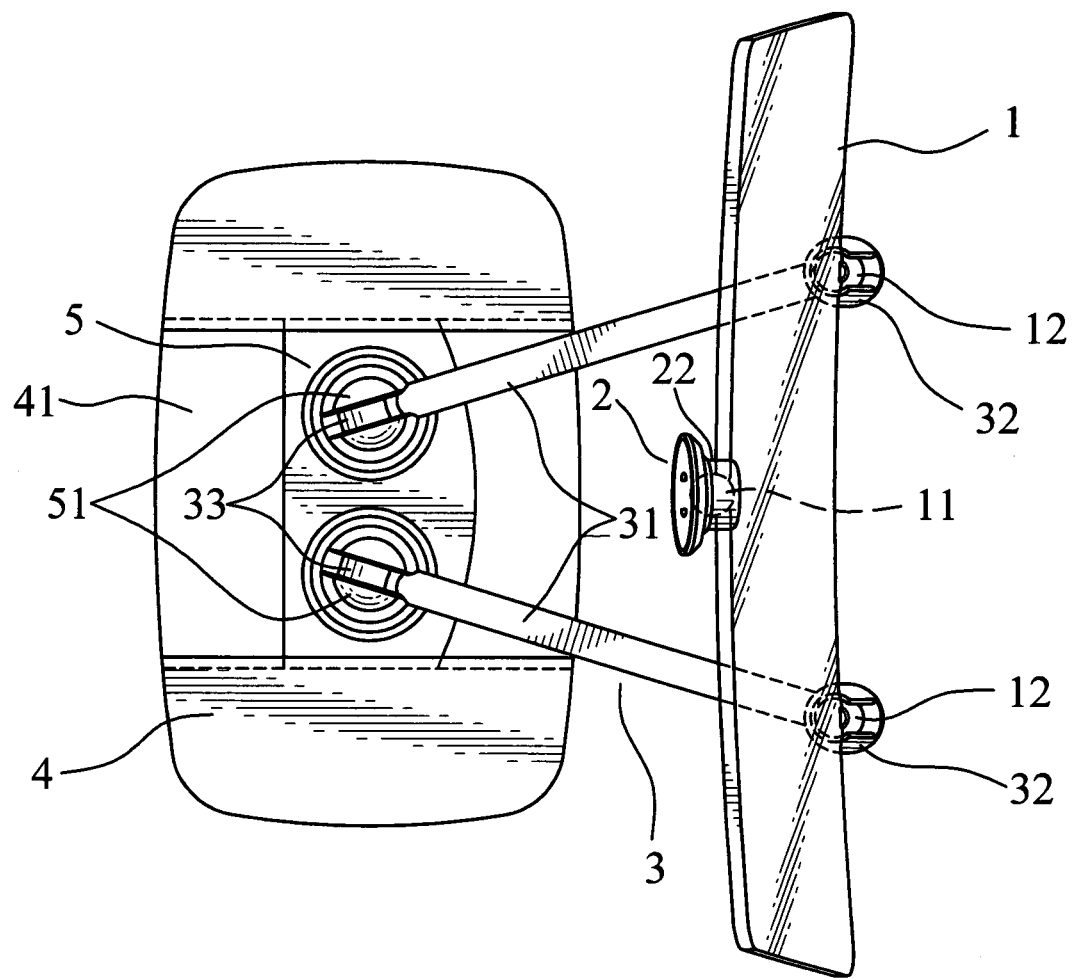
FIG. 9 is a three-dimensional schematic diagram of example 4 of the second embodiment according to the present invention.

As shown in FIG. 9, which is example 4 of the second embodiment of the aseismatic reflection sheet of the present invention, two second joint elements 12 are further set on the bottom of the reflection sheet 1; the angle fixed adjustment module 3 further includes two lateral support elements 31, a fourth joint element 32 is set on an end of the lateral support element 31, a fifth joint element 33 is set on another end of the lateral support element 31, the fourth joint element 32 is correspondingly fixed to the second joint element 12 on the bottom of the reflection sheet 1 and a rotational or bendable joint mechanism is formed; two sixth joint elements 51 are set on the top of the sliding module 5, the sixth joint element 51 is correspondingly fixed to the fifth joint element 33 of the lateral support element 31 and a joint mechanism is formed.

Figure 10:
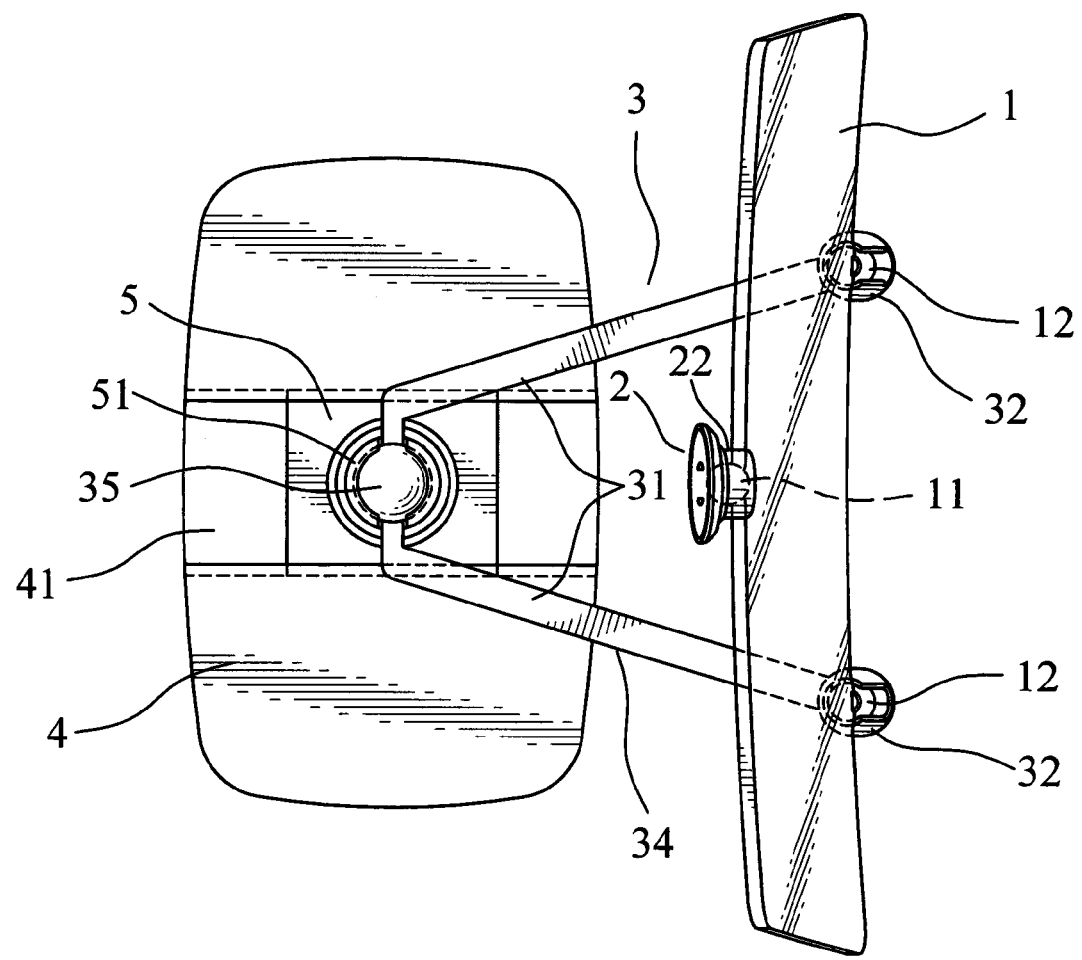
FIG. 10 is a schematic plan diagram of example 5 of the second embodiment according to the present invention.

As shown in FIG. 10, which is example 5 of the second embodiment of the aseismatic reflection sheet of the present invention, two joint elements 12 are set on the bottom of the reflection sheet 1; the angle fixed adjustment module 3 further includes a V-shaped structure 34 combined by two lateral support elements 31, a fourth joint element 32 is set on an end of the two lateral support elements 31, another ends of the two lateral support elements 31 are combined together and a seventh joint element 35 is set on, the fourth joint element 32 is correspondingly fixed to the second joint element 12 on the bottom of the reflection sheet 1 and a bendable or rotational joint mechanism is formed; and the sixth joint element 51 of the sliding module 5 is correspondingly fixed to the seventh joint element 35 and a joint mechanism is formed.

The above technical means of embodiments of the present invention may solve the problem that the conventional reflection sheet shocks severely. By using the fixed element 21 of the weight support element 2 fixed on a vehicle windshield W, the weight of the aseismatic reflection sheet device is mostly supported by the vehicle windshield W, to thereby remove or reduce the effect that the reflection sheet is affected by shocking of the vehicle dashboard B. Besides, the vehicle windshield W is the driver's line of sight, if the adhesive area of the fixed element 21 is too large, the driver's line of sight may be obstructed, thus the adhesive area may be minimized as possible. Basically, although the vehicle windshield W can support most of the weight of the reflection sheet 1, the angle and location of the reflection sheet 1 may not be fixed. In order to obtain a best visual angle and range for drivers, the angle and location of the reflection sheet 1 of the present invention still need to be relied on the vehicle dashboard B. For the vertical vibration feature of most of common vehicle dashboard B, in order to minimize the shocking influence from the vehicle dashboard B, an angle fixed adjustment module 3 with lateral strength for supporting the reflection sheet 1 is correspondingly designed in the present invention, thus, for the reflection sheet 1, the influence from vertical shocking may be significantly reduced.

What is claimed is:

1. A reflection sheet device with an aseismatic effect, the reflection sheet device comprising:
a reflection sheet, a first joint element is set on a top side and a second joint element is set on a bottom side of the reflection sheet;

a weight support element, a fixed element is set on one side of the weight support element, the fixed element is fixed on a vehicle windshield, a third joint element is set on another side of the weight support element, the third element is correspondingly connected to the first joint element on the top side of the reflection sheet and formed a bendable or rotatable joint mechanism;

an angle fixed adjustment module, which is used to fix and adjust an angle of the reflection sheet, including at least a lateral support element, a fourth joint element is set on an end of the lateral support element, the fourth element is correspondingly connected to the second joint element on the bottom side of the reflection sheet and formed a bendable or rotatable joint mechanism;

a base plate, which is a plate body fixed on a vehicle dashboard;

at least a sliding module, which is connected to the lateral support element, a positioning element is set on the bottom of the sliding module for being fixedly positioned on the base plate;

wherein, one side of the weight support element is fixed on the vehicle windshield and the weight of the reflection sheet device is mostly supported by the part of the weight support element, so that the reflection sheet does not be affected by shocking of the vehicle dashboard; the base plate is fixed on the vehicle dashboard through the connection of the lateral support element and the sliding module being positioned on the base plate, to thereby provide support to the reflection sheet and the vertical and horizontal angle may be easily adjusted.

2. The reflection sheet device as claimed in claim 1, wherein the fixed element is a double-sided adhesive tape or a sucking disc.

3. The reflection sheet device as claimed in claim 1, wherein the base plate is a magnetic metal, the positioning element is a magnet, a double-sided adhesive tape is set on the bottom of the base plate for being fixed on the vehicle dashboard.

4. The reflection sheet device as claimed in claim 1, wherein a surface of the base plate is flannel material surface that Velcro may be attached to, the positioning element has a Velcro surface, a double-sided adhesive tape is set on the bottom of the base plate for being fixed on the vehicle dashboard.

5. The reflection sheet device as claimed in claim 1, wherein the first joint element and the second joint element are spherical structure; the third joint element and the fourth joint element is concave structure.

6. The reflection sheet device as claimed in claim 1, wherein two second joint elements are further set on the bottom side of the reflection sheet; the angle fixed adjustment module further includes two lateral support element, a fourth joint element is set on an end of the lateral support element, a fifth joint element is set on another end of the lateral support element, the fourth joint element is correspondingly fixed to the second joint element on the bottom side of the reflection sheet and a rotational or bendable joint mechanism is formed; and two corresponding sliding modules, a sixth joint element is set on the top of the sliding module, the sixth joint element is correspondingly fixed to the fifth joint element of the lateral support element and a joint mechanism is formed.

7. The reflection sheet device as claimed in claim 1, wherein two second joint elements are set on the bottom of the reflection sheet; the angle fixed adjustment module further includes two lateral support elements, a fourth joint element is set on an end of the lateral support element, a fifth joint element is set on another end of the lateral support element, the fourth joint element is correspondingly fixed to the second joint element on the bottom side of the reflection sheet and a rotational or bendable joint mechanism is formed; and two sixth joint elements are set on the top of the sliding module, the sixth joint element is correspondingly fixed to the fifth joint element of the lateral support element and a joint mechanism is formed.

8. The reflection sheet device as claimed in claim 1, wherein two second joint elements are set on the bottom side of the reflection sheet; the angle fixed adjustment module further includes a V-shaped structure combined by two lateral support elements, a fourth joint element is set on an end of the two lateral support elements, another ends of the two lateral support elements are combined together and a seventh joint element is set on, the fourth joint element is correspondingly fixed to the second joint element on the bottom side of the reflection sheet and a bendable or rotational joint mechanism is formed; and the sixth joint element of the sliding module is correspondingly fixed to the seventh joint element and a joint mechanism is formed.

9. The reflection sheet device as claimed in claim 1, wherein a fifth joint element is set on another end of the lateral support element, a sixth joint element is set on the top of the sliding module, the sixth joint element is correspondingly fixed to the fifth joint element of the lateral support element and a joint mechanism is formed; the fifth joint element and the sixth joint element are combined together as a shaft structure.

10. A reflection sheet device with an aseismatic effect, the reflection sheet device comprising:

a reflection sheet, a first joint element is set on a top side and a second joint element is set on a bottom side of the reflection sheet;

a weight support element, a fixed element is set on one side of the weight support element, the fixed element is fixed on a vehicle windshield, a third joint element is set on another side of the weight support element, the third element is correspondingly connected to the first joint element on the top side of the reflection sheet and formed a bendable or rotatable joint mechanism;

an angle fixed adjustment module, which is used to fix and adjust an angle of the reflection sheet, including at least a lateral support element, a fourth joint element is set on an end of the lateral support element, the fourth element is correspondingly connected to the second joint element on the bottom side of the reflection sheet and formed a bendable or rotatable joint mechanism;

a base plate, which is a plate body fixed to a vehicle dashboard, a trench is set on the base plate;

at least a sliding module, which is connected to the lateral support element, a bottom of the sliding module is embedded into the trench of the base plate.

11. The reflection sheet device as claimed in claim 10, wherein the fixed element is a double-sided adhesive tape or a sucking disc.

12. The reflection sheet device as claimed in claim 10, wherein a double-sided adhesive tape is set on the bottom of the base plate for being fixed on the vehicle dashboard.

13. The reflection sheet device as claimed in claim 10, wherein the first joint element and the second joint element are spherical structure; the third joint element and the fourth joint element is concave structure.

14. The reflection sheet device as claimed in claim 10, wherein two second joint elements are further set on a bottom side of the reflection sheet; the angle fixed adjustment module further includes two lateral support elements, a fourth joint element is set on an end of the lateral support element, a fifth joint element is set on another end of the lateral support element, the fourth joint element is correspondingly fixed to the second joint element on the bottom side of the reflection sheet and a rotational or bendable joint mechanism is formed; two corresponding sliding modules, a sixth joint element is set on the top of the sliding module, the sixth joint element is correspondingly fixed to the fifth joint element of the lateral support element and a joint mechanism is formed.

15. The reflection sheet device as claimed in claim 10, wherein two joint elements are set on the bottom side of the reflection sheet; the angle fixed adjustment module further includes two lateral support elements, a fourth joint element is set on an end of the lateral support element, a fifth joint elements is set on another end of the lateral support element, the fourth joint elements is correspondingly fixed to the second joint elements on the bottom side of the reflection sheet and a rotational or bendable joint mechanism is formed; two sixth joint elements are set on the top of the sliding module, the sixth joint element is correspondingly fixed to the fifth joint element of the lateral support element and a joint mechanism is formed.

16. The reflection sheet device as claimed in claim 10, wherein two joint elements are set on the bottom side of the reflection sheet; the angle fixed adjustment module further includes a V-shaped structure combined by two lateral support elements, a fourth joint element is set on an end of the two lateral support elements, another ends of the two lateral support elements are combined together and a seventh joint element is set on, the fourth joint element is correspondingly fixed to the second joint element on the bottom side of the reflection sheet and a bendable or rotational joint mechanism is formed; and the sixth joint element of the sliding module is correspondingly fixed to the seventh joint element and a joint mechanism is formed.

17. The reflection sheet device as claimed in claim 10, wherein a fifth joint element is set on another end of the lateral support element, a sixth joint element is set on the top of the sliding module, the six joint element is correspondingly fixed to the fifth joint element of the lateral support element and a joint mechanism is formed; the fifth joint element and the sixth joint element are combined together as a shaft structure.

\* \* \* \* \*